(12) United States Patent
Komine et al.

(10) Patent No.: US 7,144,209 B2
(45) Date of Patent: Dec. 5, 2006

(54) CONCAVE PART COVER

(75) Inventors: Tsuyoshi Komine, Hyogo (JP); Takashi Yamamoto, Osaka (JP); Hirokazu Suruga, Osaka (JP)

(73) Assignee: Big Alpha Co., Inc., Hyogo (JP)

( * ) Notice: Subject to any disclaimer, the term of this patent is extended or adjusted under 35 U.S.C. 154(b) by 161 days.

(21) Appl. No.: 10/741,378

(22) Filed: Dec. 19, 2003

(65) Prior Publication Data

US 2004/0168544 A1 Sep. 2, 2004

(30) Foreign Application Priority Data

Dec. 24, 2002 (JP) .............................. 2002-372990

(51) Int. Cl.
*B23Q 11/08* (2006.01)
*F16P 1/00* (2006.01)

(52) U.S. Cl. ............................ 409/134; 74/608; 52/468

(58) Field of Classification Search ................ 409/234, 409/134; 408/241 G; 160/202, 222, 233; 52/730.3, 731.7, 468; 16/2.1; 74/608, 609, 74/610, 611, 612, 613, 614, 615, 616; 24/462
See application file for complete search history.

(56) References Cited

U.S. PATENT DOCUMENTS

| | | | | |
|---|---|---|---|---|
| 1,218,676 A | * | 3/1917 | Lester | .......................... 52/468 |
| 2,990,650 A | * | 7/1961 | Attwood | ....................... 52/468 |
| 3,410,043 A | * | 11/1968 | Rijnders | ....................... 52/468 |
| 3,681,887 A | * | 8/1972 | Loew | .......................... 52/716.6 |
| 4,418,508 A | * | 12/1983 | Gilliland et al. | ......... 52/718.05 |
| 4,449,870 A | * | 5/1984 | Suzuki | ........................ 409/134 |
| 5,752,297 A | * | 5/1998 | Ramey | ......................... 24/462 |

FOREIGN PATENT DOCUMENTS

JP 583836 6/1982
JP 57-178639 11/1982

* cited by examiner

*Primary Examiner*—Erica Cadugan
*Assistant Examiner*—Dana Ross
(74) *Attorney, Agent, or Firm*—Wolf, Greenfield & Sacks, P.C.

(57) ABSTRACT

The present invention provides a concave part cover that can be easily inserted and be safely secured in a concave part even if tolerances and dimensional errors of the concave part such as a slot or a hole, and of the concave part cover for covering the concave part are large. The concave part cover comprises: a top plate 11 for covering the concave part; and a pair of pressing parts 12A and 12B extending from the top plate 11 and pressing side walls 52A and 52B of the concave part when the pressing parts 12A and 12B are inserted into the concave part. Base ends 15A and 15B of the pressing parts 12A and 12B are positioned at the top plate 11 in such a manner that a distance between the base ends 15A and 15B is shorter than distance W (between the side walls 52A and 52B), and portions of extending parts 16A and 16B of the pressing parts 12A and 12B are formed to project outwards until they are spaced at a wider distance therebetween than the distance W.

23 Claims, 9 Drawing Sheets

CONCAVE PART COVER

BACKGROUND

The present invention relates to a concave part cover for covering a concave part such as a slot or a hole formed in a machine tool.

Various kinds of slot covers for covering slots formed in machine tools have been suggested.

For example, Japanese Patent Laid-Open (Kokai) Publication No. SHO 57-178639 discloses a T-slot guard that should be used for such machine tools as milling machines, drilling machines, shaping machines, planing machines, and horizontal boring machines, and that comprises a flat top web with a hole punched therein, and two parallel guiding legs which extend downwards from the top web.

Moreover, Japanese Design Registration No. 583836 suggests a machine tool table slot cover that is used to cover a slot in a machine tool table and to prevent, for example, tools or chips generated during machining from falling into the slot. This machine tool table slot cover comprises: a top plate for covering the slot; and a pair of legs mounted perpendicularly to the top plate. Concerning the slot cover, the top plate and each leg form an angle of approximately 90 degrees. The lower parts of the legs project slightly outwards.

This machine tool table slot cover described in the above-mentioned Design Registration is used to seal (or cover) a slot with its top plate by inserting the legs into the slot. When the legs of the machine tool table slot cover are inserted into the slot, projections formed at the top ends of the legs are caused to contact the side walls of the slot, thereby securing the slot cover in the slot.

However, regarding the T-slot guard and the slot cover described in the above-mentioned publications, since the guiding legs are mounted perpendicularly to the top web (or top plate), it is difficult to make the guiding legs fit in the slot with width tolerances. Accordingly, when the T-slot guard or the slot cover is mounted in a slot having a width of a large tolerance, there is a possibility that the T-slot guard or the slot cover may not partly or sometimes fit securely in the slot. Moreover, when the tolerance for the dimensional accuracy of the width is large when manufacturing the T-slot guard or the slot cover, there is a possibility that the T-slot guard or the slot cover may not partly or sometimes fit securely in the slot.

SUMMARY

The present invention aims to solve the above-described conventional problems. It is an object of this invention to provide a concave part cover that can be easily inserted and be safely secured in a concave part even if tolerances and dimensional errors of the concave part such as a slot or a hole, and of the concave part cover for covering the concave part are large.

In order to achieve the above-described object, this invention provides a concave part cover for covering a concave part formed in the table of a machine tool, the concave part cover comprising: a top plate for covering the concave part; and a pair of pressing parts extending from the top plate and pressing side walls of the concave part when they are inserted into the concave part; wherein base ends of the pressing parts are positioned at the top plate in such a manner that the distance between the base ends is shorter than the distance between the side walls pressed by the pressing parts, and portions of extending parts of the pressing parts, which extend from the base ends, are formed to project outwards until they are spaced at a wider distance therebetween than the distance between the side walls of the concave part.

Regarding the concave part cover having the above-described structure, portions of the extending parts of the pressing parts are formed to project outwards until they are spaced at a wider distance therebetween than the distance between the side walls of the concave part. However, the concave part cover can be inserted into the concave part by tilting the concave part cover. When the extending parts are inserted into the concave part, their elasticity causes the extending parts to press the side walls of the concave part. Accordingly, even if the tolerances and dimensional errors of the concave part and of the concave part cover for covering the concave part are large to a certain degree, it is still possible to easily insert and safely secure the concave part cover in the concave part.

The concave part cover of this invention can be structured in such a manner that a relationship of distance W (between the side walls of the concave part), distance L (between the outermost projection of one extending part and the outermost projection of the other extending part), and angle θ (formed by the first line linking the base end of one pressing part and the outermost projection of one extending part and the second line linking the base end of the other pressing part and the outermost projection of the other extending part) is represented by the following mathematical expression 1:

$$W \geq L \cdot \cos(\theta/2) \quad \text{[Mathematical Expression 1]}$$

where W is less than L (W<L).

Moreover, the pair of pressing parts can be structured in such a manner that a first line linking the base end of one pressing part and an outermost projection of one extending part and a second line linking the base end of the other pressing part and an outermost projection of the other extending part cross each other at an angle of 20 degrees to 30 degrees inclusive.

The pair of pressing parts can be spaced in such a manner that the distance between them in an area close to the top ends of the extending parts is wider than the distance between the side walls of concave part.

It is also possible to employ such a structure that the minimum allowable dimension of the distance between the outermost projection of one extending part and the outermost projection of the other extending part is larger than the maximum allowable dimension of the concave part.

Concerning the concave part cover of this invention, an engaging part which engages with a removal tool for removing the concave part cover from the concave part can be formed at the top plate. This structure further facilitates the removal of the concave part cover from the concave part. The engaging part can be a small hole made in the top plate.

Furthermore, the concave part can be a T-slot formed in a table for holding a workpiece.

DETAILED DESCRIPTION

Slot covers for concave parts according to preferred embodiments of this invention are described below with reference to the attached drawings. However, Embodiments 1 and 2 are described below merely for purposes of illustration to explain the present invention. This invention is not limited only to these embodiments. Accordingly, this invention can be practiced in various manners as long as such manners of practice would not depart from the gist of this invention.

Embodiment 1

Figure 1:
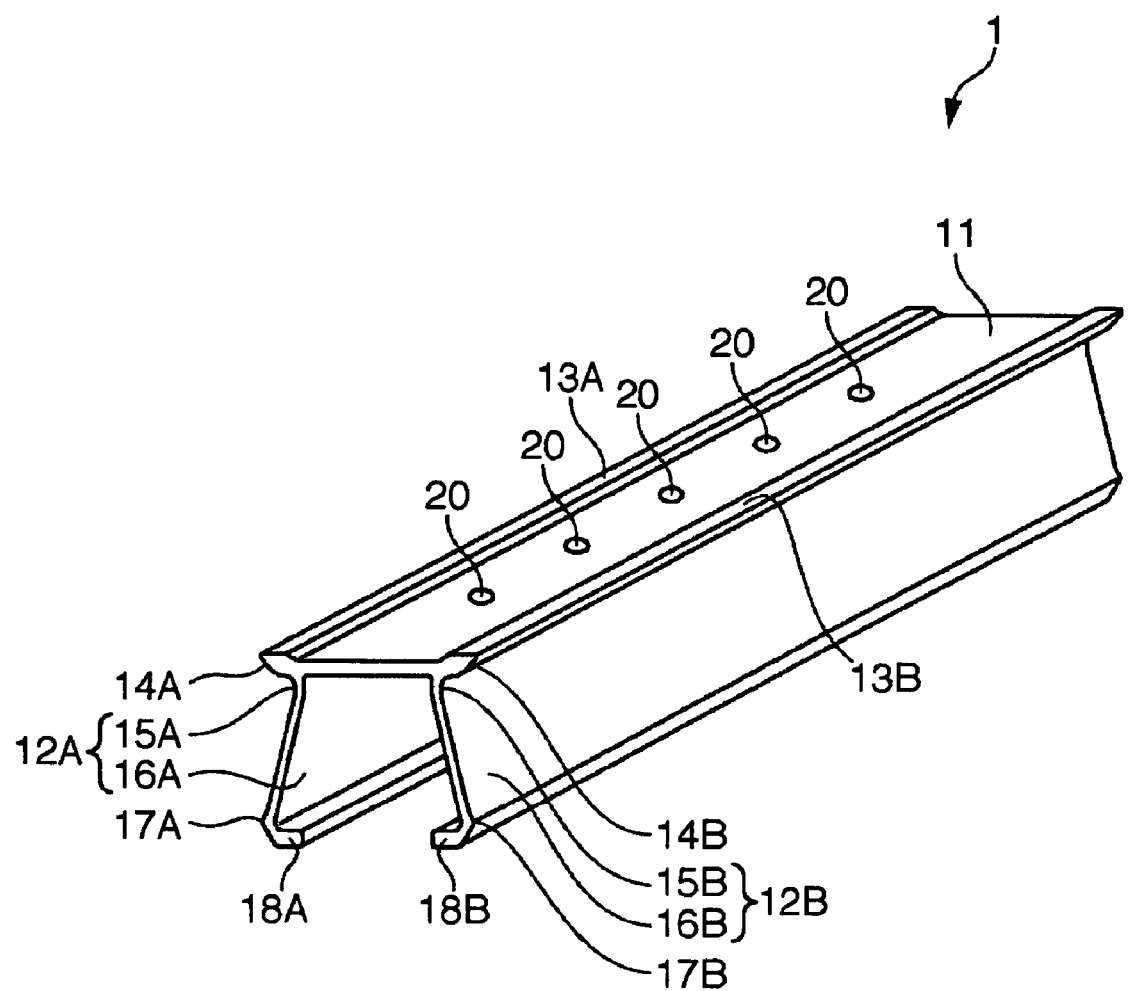
FIG. 1 is a perspective view of a slot cover according to Embodiment 1 of this invention.
Figure 2:
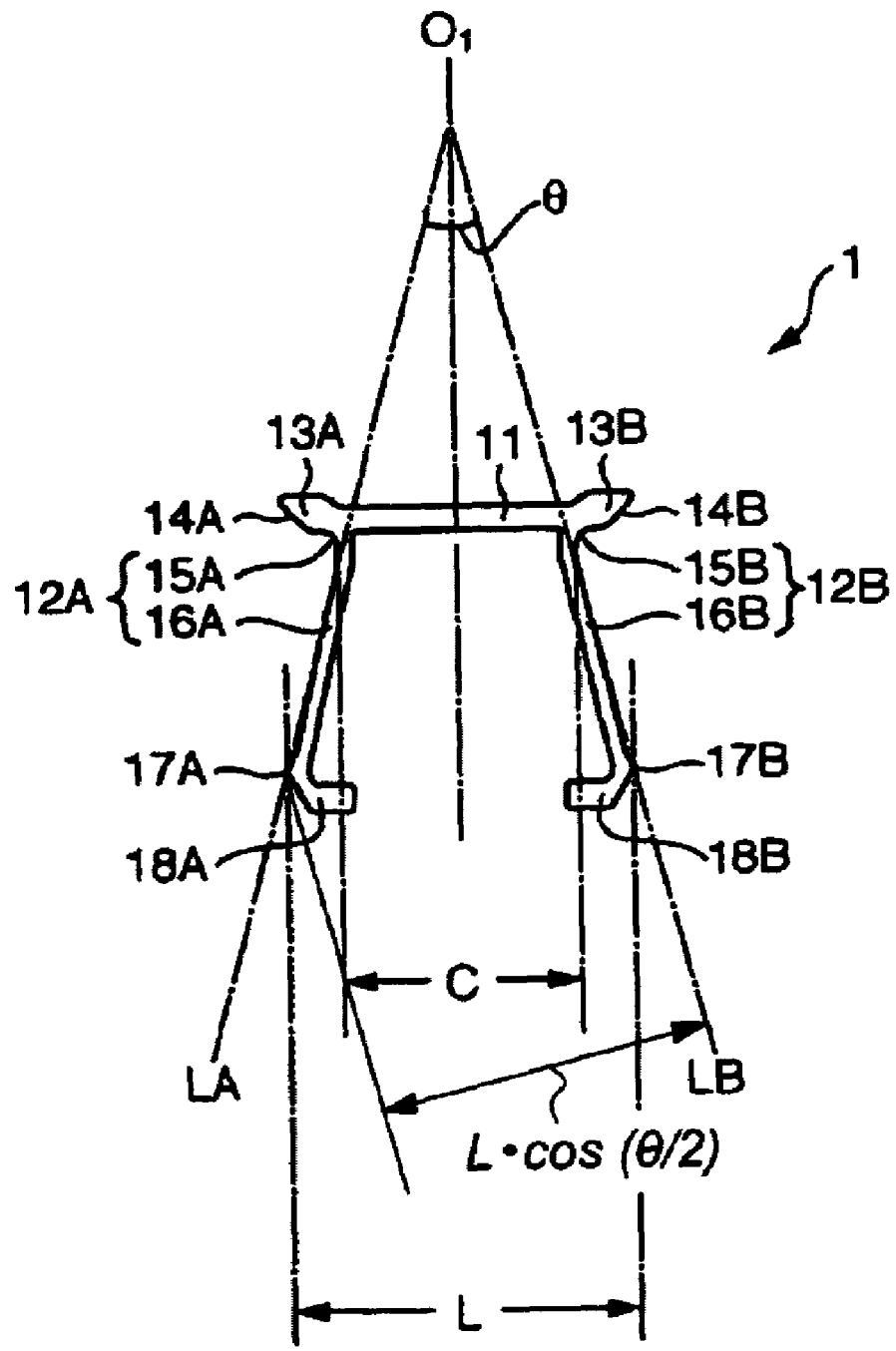
FIG. 2 is an enlarged front view of the slot cover shown in FIG. 1.
Figure 3:
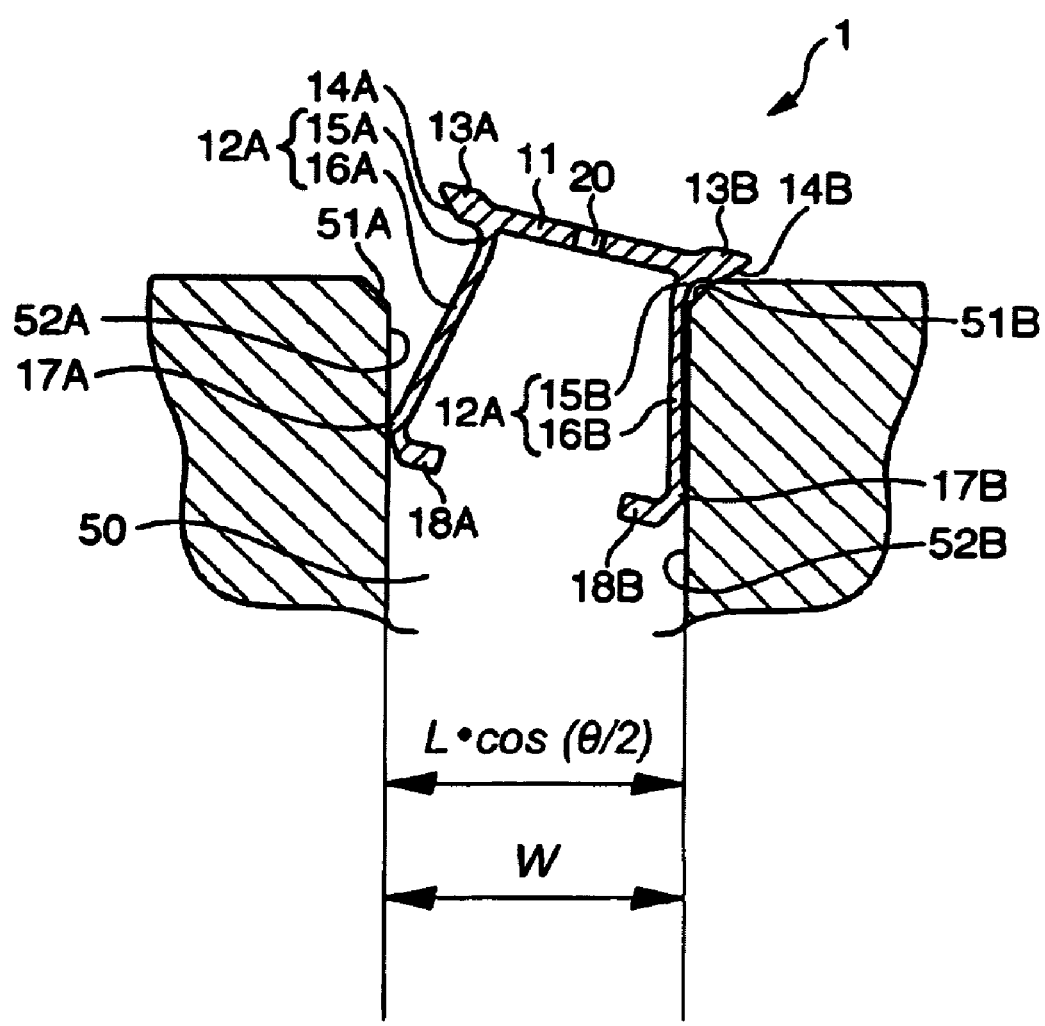
FIG. 3 is an enlarged sectional view of the slot cover shown in FIG. 1 in a state where the slot cover is being inserted into a T-slot.
Figure 4:
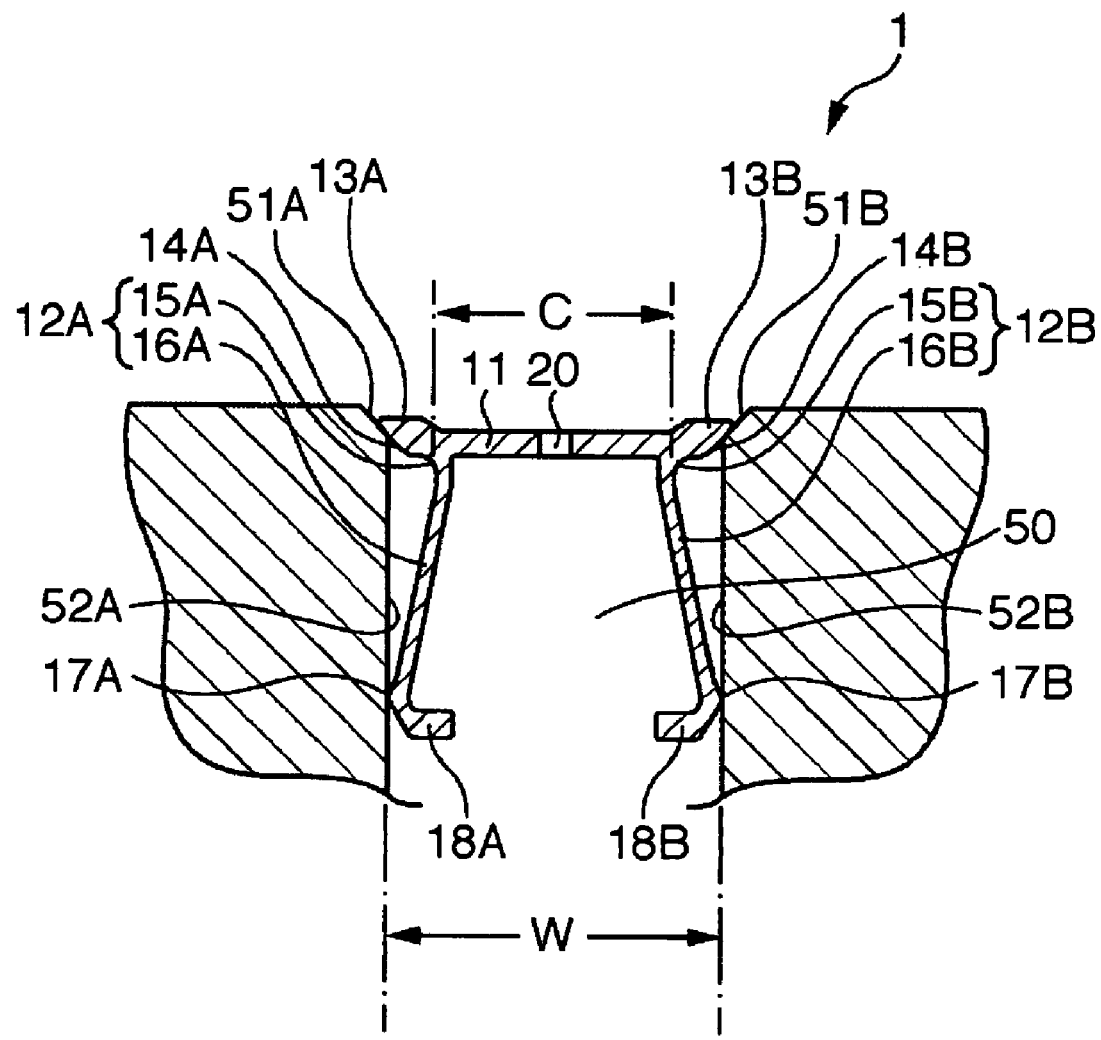
FIG. 4 is an enlarged sectional view of the slot cover shown in FIG. 1 in a state where the slot cover is inserted in the T-slot.
Figure 5:
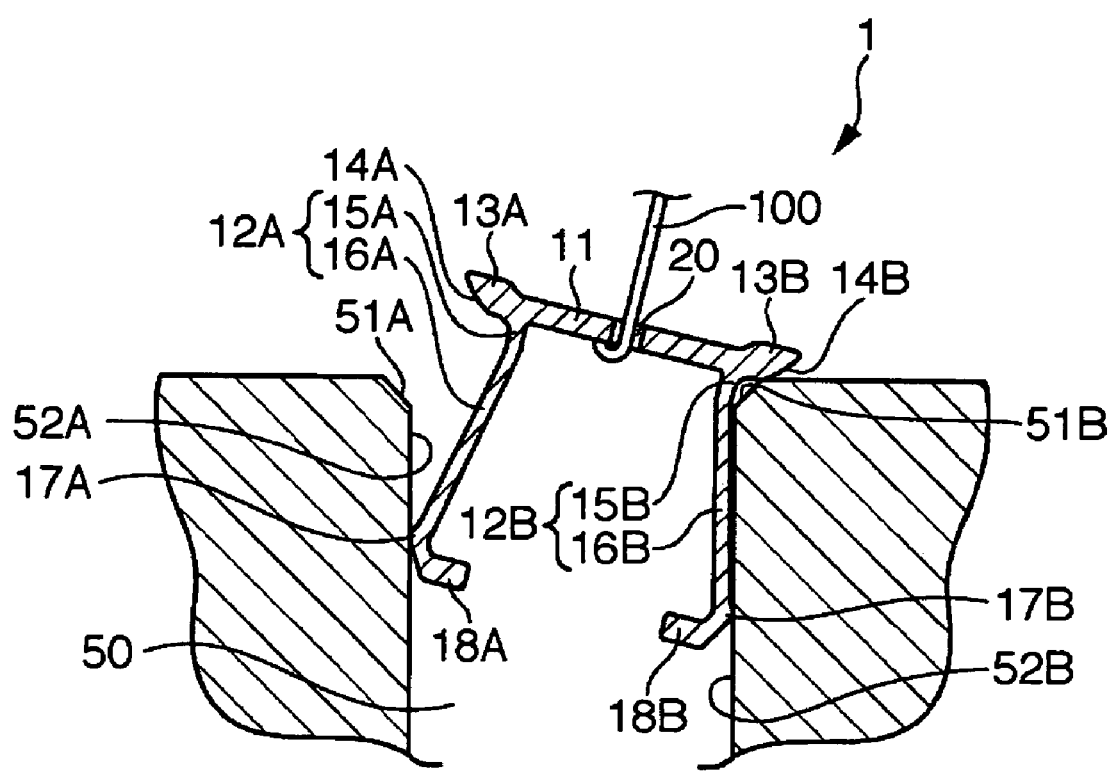
FIG. 5 is an enlarged sectional view of the slot cover shown in FIG. 1 in a state where the slot cover is being removed from the T-slot.

FIG. 1 is a perspective view of a slot cover for a concave part (hereinafter referred to as the "slot cover") according to Embodiment 1 of this invention. FIG. 2 is an enlarged front view of the slot cover shown in FIG. 1. FIG. 3 is an enlarged sectional view of the slot cover shown in FIG. 1 in a state where the slot cover is being inserted into a T-slot. FIG. 4 is an enlarged sectional view of the slot cover shown in FIG. 1 in a state where the slot cover is inserted in the T-slot. FIG. 5 is an enlarged sectional view of the slot cover shown in FIG. 1 in a state where the slot cover is being removed from the T-slot.

As shown in FIGS. 1 to 5, a slot cover 1 according to Embodiment 1 comprises: a top plate 11 for covering a T-slot 50 of a machine tool; and a pair of pressing parts 12A and 12B extending from the bottom surface of the top plate 11.

On both sides of the T-slot 50, in the lengthwise direction, convex edges 13A and 13B are formed on the upper surface of the top plate 11. On both sides of the T-slot 50, in the lengthwise direction, inclined parts 14A and 14B are formed on the bottom surface of the top plate 11 in the shape complementary to edges 51A and 51B of the T-slot 50. In the top plate 11, several small holes 20 are made as engaging parts for engaging with a removal tool 100 (see FIG. 5) for removing, from the T-slot 50, the slot cover 1 that has been inserted into the T-slot 50. These small holes 20 are structured in such size as to avoid tools or chips generated during machining of a workpiece from entering the T-slot 50.

A pair of pressing parts 12A and 12B are formed symmetrically with respect to center line $O_1$ of the slot cover 1 (see FIG. 2), and the top plate and each pressing part 12A or 12B form an obtuse angle. When inserted into the T-slot 50, these pressing parts 12A and 12B respectively press side walls 52A and 52B of the T-slot 50 (see FIG. 4). The base ends 15A and 15B of the pressing parts 12A and 12B are positioned at the bottom surface of the top plate 11 in such a manner that the distance between the pressing parts 12A and 12B is shorter than distance W between the side walls 52A and 52B (see FIG. 4). In other words, distance C between the outside surface of the base end 15A of the pressing part 12A and the outside surface of the base end 15B of the pressing part 12B (see FIGS. 2 and 4) is shorter than distance W between the side walls 52A and 52B (W>C).

The top ends 18A and 18B of the extending parts 16A and 16B extending from the top plate 11 are bent so that they are opposed to each other. When receiving external force, these pressing parts 12A and 12B can elastically deform in such directions as to cause the extending parts 16A and 16B to come closer to each other.

The top end areas of the extending parts 16A and 16B, which are the areas adjacent to the top ends 18A and 18B, project outwards until they are spaced at a wider distance than distance W (between the side walls 52A and 52B). Specifically, the extending parts 16A and 16B are spaced from each other in such a manner that the distance between them on the top end side is longer than distance W, and distance L (see FIG. 2) between an outermost projection 17A of the extending part 16A and an outermost projection 17B of the extending part 16B is longer than distance W (L>W). As shown in FIG. 2, a first line LA linking the outermost projection 17A and the base end 15A and a second line LB linking the outermost projection 17B and the base end 15B cross each other at angle θ (20°≦θ≦30°).

The minimum allowable dimension of distance L between the outermost projection 17A of the extending part 16A and the outermost projection. 17B of the extending part 16B is larger than the maximum allowable dimension of distance W between the side walls 52A and 52B of the T-slot 50. For example, when the dimension (distance W) between the side walls 52A and 52B of the T-slot 50 is 18.0±0.2 mm including a tolerance necessary to manufacture the slot, the maximum allowable dimension of the T-slot 50 is 18.2 mm. However, if a tolerance necessary to manufacture the slot cover 1 by means of aluminum extrusion is ±0.2 mm, the minimum allowable dimension of distance L between the outermost projection 17A of the extending part 16A and the outermost projection 17B of the extending part 16B is X−0.2 mm. A relationship between this minimum allowable dimension (X−0.2 mm) and the maximum allowable dimension (18.2 mm) of the T-slot 50 is expressed as follows:

(X−0.2 mm)>18.2 mm

Therefore, X is larger than 18.4 mm (X>18.4 mm).

As a result, according to the above condition, distance L between the outermost projection 17A of the extending part 16A and the outermost projection 17B of the extending part 16B is set to a value larger than 18.4 mm.

Moreover, a relationship between distance W, distance L, and angle θ is represented by the following mathematical expression 1:

$W \geq L \cdot \cos(\theta/2)$ [Mathematical Expression 1]

where W is less than L (W<L).

Specific working of the slot cover 1 according to Embodiment 1 is described below.

In order to set the slot cover 1 in the T-slot 50 to cover the opening of the T-slot 50, firstly the slot cover 1 needs to be tilted when inserting the extending parts 16A and 16B into the T-slot 50 (see FIG. 3). The slot cover 1 is then pushed into the T-slot 50 until the top plate 11 of the slot cover 1 becomes horizontal. Since the slot cover 1 is designed in such a manner that distance L between the outermost projection 17A of the extending part 16A and the outermost projection 17B of the extending part 16B is longer than distance W between the side walls 52A and 52B, as the extending parts 16A and 16B are pushed into the T-slot 50, they are pushed by the side walls 52A and 52B and are thereby caused to elastically deform in such directions as to shorten distance L. As a result, the top plate 11 covers the opening of the T-slot 50 (see FIG. 4).

The extending parts 16A and 16B of the slot cover 1, which have been inserted into the T-slot 50 and are in the state shown in FIG. 4, then press the side walls 52A and 52B of the T-slot 50 by means of their elastic restoring forces. Therefore, the slot cover 1 is securely fastened to the T-slot 50. Moreover, since the inclined parts 14A and 14B in the shape complementary to the edges 51A and 51B of the T-slot 50 are formed on the bottom surface of the top plate 11, the slot cover 1 is further securely fastened to the T-slot 50 and can securely cover the opening of the T-slot 50. By using the slot cover 1 as described above to cover the T-slot 50 made in a machine tool, it is possible to prevent any tools or chips generated during processing from falling into the slot, thereby improving working efficiency.

As shown in FIG. 5, the slot cover 1 can be easily removed from the T-slot 50 by inserting the top end of a removal tool 100 for removing the slot cover 1 into the small hole 20 in the top plate 11, then causing the removal tool 100 to engage with the small hole 20, and pulling the slot cover 1 from the T-slot 50.

Concerning Embodiment 1, the case in which the slot cover 1 is used as the concave part cover in order to cover the T-slot 50 has been described. However, without limitation to the structure of the slot cover 1, the concave part cover of this invention can be structured by arbitrarily setting, for example, the shape, length and width of the top plate, the mounting positions of the base ends 15A and 15B of the pressing parts 12A and 12B, and the length of and distance L between the extending parts 16A and 16B in order to cover a slot or a hole of other shapes in a machine tool. However, in any case, the following condition should be met: the base ends 15A and 15B should be positioned at the top plate in such a manner that the distance between them is shorter than distance W between the side walls of the concave part (such as the T-slot 50), and distance L between the outermost projection 17A of the extending part 16A and the outermost projection 17B of the extending part 16B should be longer than distance W.

Figure 6:
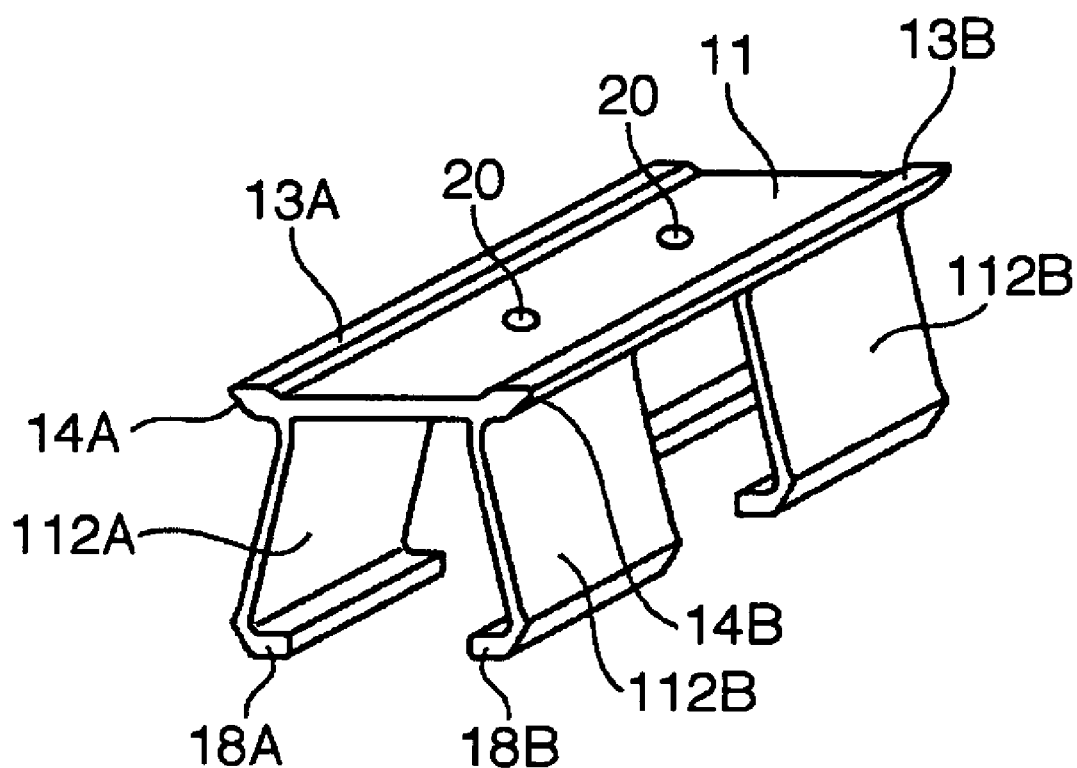
FIG. 6 is a perspective view of a slot cover according to another embodiment of this invention.

Moreover, each of the pressing parts 12A and 12B is made of one generally-plate-shaped continuous member. However, as shown in FIG. 6, a plurality of pressing parts 112A (or 112B) may be positioned at certain intervals between them in the lengthwise direction of the top plate 11.

Furthermore, the small holes 20 in the top plate 11 may be formed at any position, for example, at positions closer to either the convex edge 13A or the convex edge 13B.

Embodiment 2

A slot cover according to Embodiment 2 of this invention is described below with reference to the relevant drawings.

Figure 7:
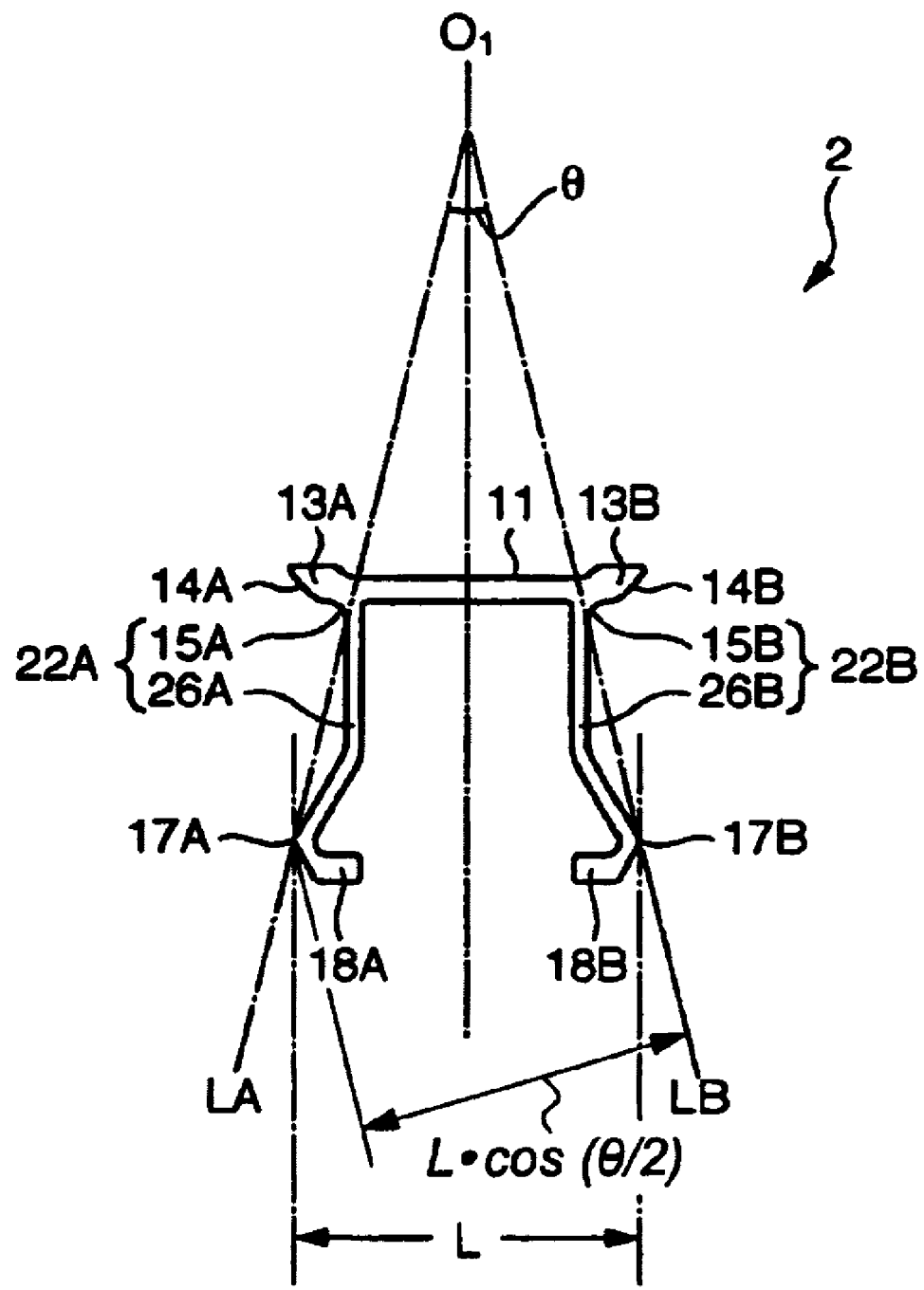
FIG. 7 is a front view of a slot cover according to Embodiment 2 of this invention.
Figure 8:
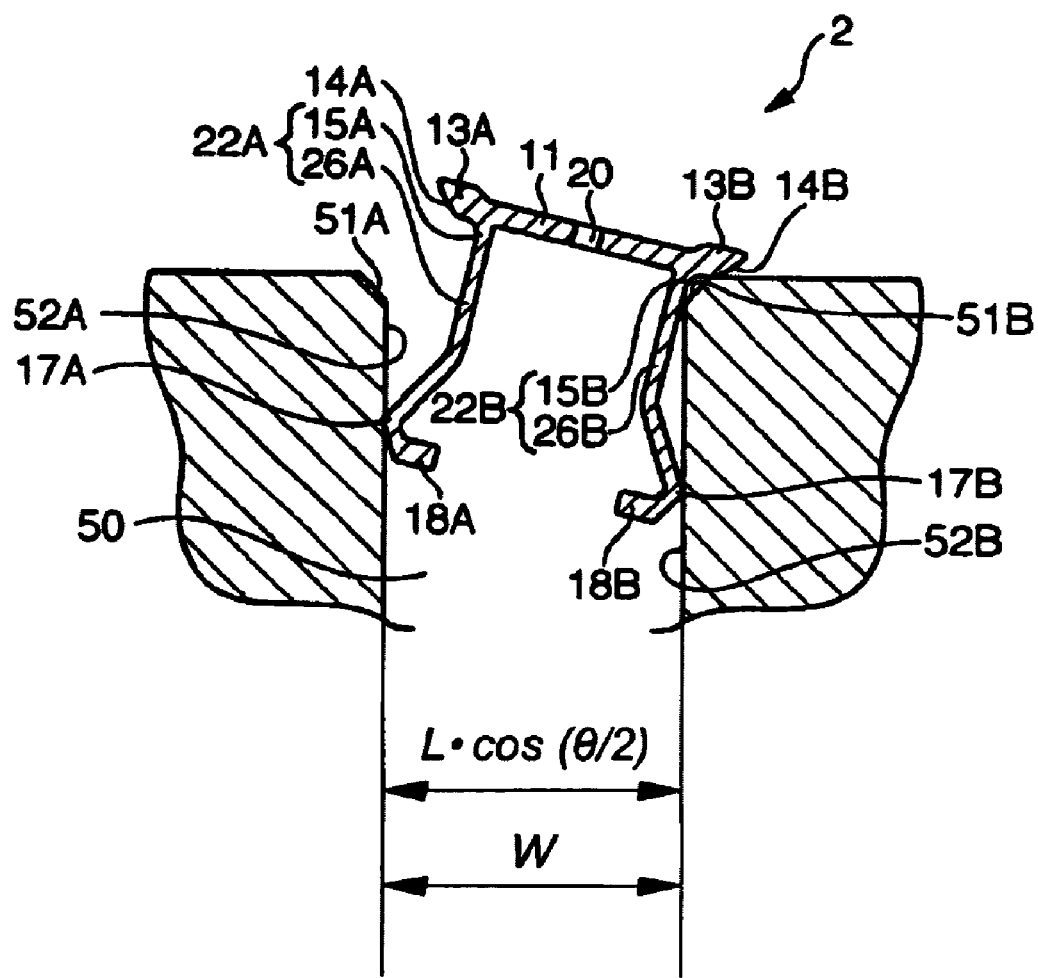
FIG. 8 is a sectional view of the slot cover shown in FIG. 7 in a state where the slot cover is being inserted into a T-slot.
Figure 9:
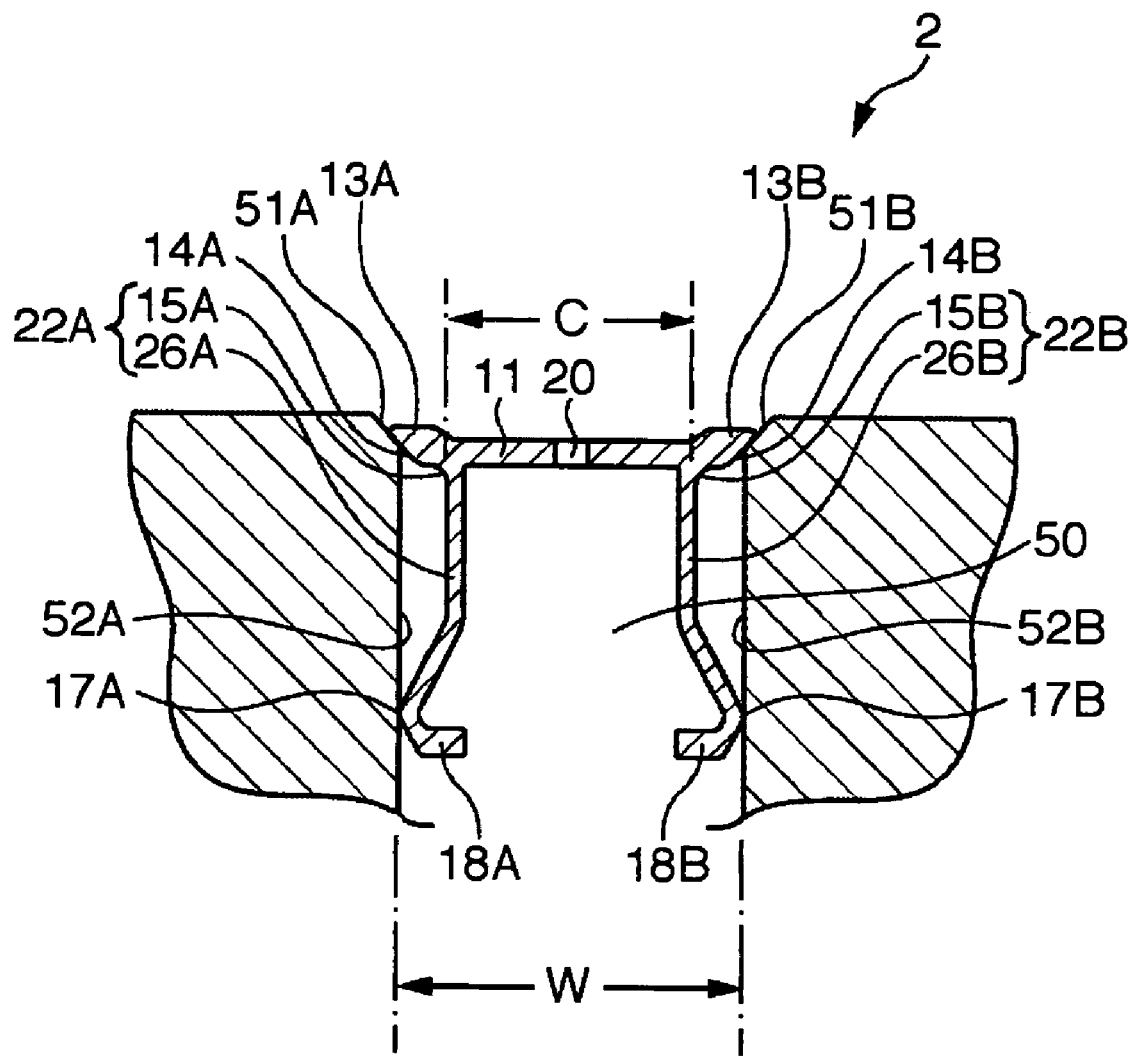
FIG. 9 is a sectional view of the slot cover shown in FIG. 7 in a state where the slot cover is inserted in the T-slot.

FIG. 7 is a front view of the slot cover according to Embodiment 2. FIG. 8 is a sectional view of the slot cover shown in FIG. 7 in a state where the slot cover is being inserted into a T-slot. FIG. 9 is a sectional view of the slot cover shown in FIG. 7 in a state where the slot cover is inserted in the T-slot.

Regarding Embodiment 2, elements described in Embodiment 1 are given the same reference numerals as those in Embodiment 1, and any detailed description thereof is omitted.

As shown in FIGS. 7 to 9, the main difference between a slot cover 2 of Embodiment 2 and the slot cover 1 of Embodiment 1 is the shape of extending parts 26A and 26B, which are components of pressing parts 22A and 22B.

Specifically speaking, the pressing parts 22A and 22B are formed symmetrically with respect to center line $O_1$ of the slot cover 2 (see FIG. 7). When viewed from the front, the pressing parts 22A and 22B are parallel to each other from their base ends to the generally midsections of their extending parts 26A and 26B, and the lower parts of the extending parts 26A and 26B below their midsections are spaced apart from each other and extend outwards. The pressing parts 22A and 22B, as in the case of the pressing parts 12A and 12B, respectively press the side walls 52A and 52B of the T-slot 50 when they are inserted into the T-slot 50. The base ends 15A and 15B of the pressing parts 22A and 22B, as in the case of the pressing parts 12A and 12B, are positioned at the bottom surface of the top plate 11 in such a manner that the distance between the pressing parts 22A and 22B is shorter than distance W between the side walls 52A and 52B (see FIG. 9). In other words, distance C between the outside surface of the base end 15A of the pressing part 22A and the outside surface of the base end 15B of the pressing part 22B (see FIG. 9) is shorter than distance W between the side walls 52A and 52B (W>C).

The outwardly extending lower parts of the extending parts 26A and 26B project outwards until they are spaced at a wider distance than distance W (between the side walls 52A and 52B). Specifically, distance L (see FIG. 7) between the outermost projection 17A of the extending part 26A and the outermost projection 17B of the extending part 26B is longer than distance W (L>W). As shown in FIG. 7, the first line LA linking the outermost projection 17A and the base end 15A and the second line LB linking the outermost projection 17B and the base end 15B cross each other at angle θ (20°≦θ≦30°).

Concerning the slot cover 2 as with the slot cover 1, the minimum allowable dimension of distance L between the outermost projection 17A of the extending part 26A and the outermost projection 17B of the extending part 26B is larger than the maximum allowable dimension of distance W between the side walls 52A and 52B of the T-slot 50. Moreover, a relationship between distance W, distance L, and angle θ is represented by the aforementioned Mathematical Expression 1 where W is less than L (W<L).

The slot cover 2 of Embodiment 2, as in the case of the slot cover 1 of Embodiment 1, can cover the opening of the T-slot 50 when it is inserted into the T-slot 50. When inserting the slot cover 2, the extending parts 26A and 26B are pushed by the side walls 52A and 52B and are thereby caused to elastically deform in such directions to shorten distance L. In this manner, the slot cover 2 is pushed into the T-slot 50 and the top plate 11 finally covers the opening of the T-slot 50 (see FIG. 9). The extending parts 26A and 26B of the slot cover 2, which have been inserted into the T-slot 50 and are in the state shown in FIG. 9, then press the side walls 52A and 52B of the T-slot 50 by means of their elastic restoring forces. Therefore, the slot cover 2 is securely fastened to the T-slot 50. Moreover, the slot cover 2 can be removed from the T-slot 50 in the same manner as in Embodiment 1.

As described above, the concave part cover of this invention is structured in such a manner that portions of the extending parts of the pressing parts are formed to project outwards until they are spaced at a wider distance therebetween than the distance between the side walls of the concave part. However, this concave part cover can be inserted into the concave part by tilting the concave part cover. When both the extending parts are inserted into the concave part, their elasticity causes them to press the side walls of the concave part. As a result, even if tolerances and dimensional errors of the concave part cover for covering the concave part are large to a certain extent, it is possible to easily insert and safely secure the concave part cover in the concave part.

We claim:

1. A concave slot cover for covering a concave slot formed in a machine tool, the concave slot cover comprising:
    a top plate for covering the concave slot; and
    a pair of pressing parts extending from the top plate, the pressing parts having outermost projections that contact side walls of the concave slot after the concave slot cover is installed in the concave slot;
    wherein base ends of the pressing parts are positioned at the top plate in such a manner that the distance between the base ends is shorter than the distance between the side walls pressed by the pressing parts, and portions of extending parts of the pressing parts, which extend from the base ends, are formed to project outwards until they are spaced at a wider distance therebetween than the distance between the side walls of the concave slot, and
    wherein a relationship between distance W (between the side walls of the concave slot), distance L (between an outermost projection of one extending part and an outermost projection of the other extending part), and angle θ (formed by a first line linking the base end of one pressing part and the outermost projection of one extending part and a second line linking the base end of the other pressing part and the outermost projection of the other extending part) is represented by the following mathematical expression 1:

$$W \geq L \cdot \cos(\theta/2)$$  [Mathematical Expression 1]

where W is less than L (W<L); and
    wherein the concave slot has a thickness that is greater than a distance between the base ends and the outermost projections of the pressing parts of the concave slot cover.

2. The concave slot cover according to claim 1, wherein a first line linking the base end of one pressing part and an outermost projection of one extending part and a second line linking the base end of the other pressing part and an outermost projection of the other extending part cross each other at an angle of 20 degrees to 30 degrees inclusive.

3. The concave slot cover according to claim 2, wherein the minimum allowable dimension of a distance between an outermost projection of one extending part and an outermost projection of the other extending part is larger than the maximum allowable dimension of the concave slot.

4. The concave slot cover according to claim 2, wherein the pair of pressing parts are spaced in such a manner that a distance between them in an area close to the top ends of the extending parts is wider than the distance between the side walls of the concave slot and
    wherein the minimum allowable dimension of a distance between an outermost projection of one extending part and an outermost projection of the other extending part is larger than the maximum allowable dimension of the concave slot.

5. The concave slot cover according to claim 2, wherein an engaging part which engages with a removal tool for removing the concave slot cover from the concave slot is formed at the top plate.

6. The concave slot cover according to claim 5, wherein the engaging part is a small hole made in the top plate.

7. The concave slot cover according to claim 2, wherein the pair of pressing parts are spaced in such a manner that a distance between them in an area close to the top ends of the extending parts is wider than the distance between the side walls of the concave slot, and
    wherein an engaging part which engages with a removal tool for removing the concave slot cover from the concave slot is formed at the top plate.

8. The concave slot cover according to claim 2, wherein the minimum allowable dimension of a distance between an outermost projection of one extending part and an outermost projection of the other extending part is larger than the maximum allowable dimension of the concave slot, and
    wherein an engaging part which engages with a removal tool for removing the concave slot cover from the concave slot is formed at the top plate.

9. The concave slot cover according to claim 2, wherein the pair of pressing parts are spaced in such a manner that a distance between them in an area close to the top ends of the extending parts is wider than the distance between the side walls of the concave slot,
    wherein the minimum allowable dimension of a distance between an outermost projection of one extending part and an outermost projection of the other extending part is larger than the maximum allowable dimension of the concave slot, and
    wherein an engaging part which engages with a removal tool for removing the concave slot cover from the concave slot is formed at the top plate.

10. The concave slot cover according to claim 2, wherein the concave slot is a T-slot formed in a table for holding a workpiece.

11. The concave slot cover according to claim 1, wherein the pair of pressing parts are spaced in such a manner that a distance between them in an area close to the top ends of the extending parts is wider than the distance between the side walls of the concave slot.

12. The concave slot cover according to claim 1, wherein the minimum allowable dimension of a distance between an outermost projection of one extending part and an outermost projection of the other extending part is larger than the maximum allowable dimension of the concave slot.

13. The concave slot cover according to claim 1, wherein the pair of pressing parts are spaced in such a manner that a distance between them in an area close to the top ends of the extending parts is wider than the distance between the side walls of the concave slot, and
    wherein the minimum allowable dimension of a distance between an outermost projection of one extending part and an outermost projection of the other extending part is larger than the maximum allowable dimension of the concave slot.

14. The concave slot cover according to claim 1, wherein an engaging part which engages with a removal tool for removing the concave slot cover from the concave slot is formed at the top plate.

15. The concave slot cover according to claim 14, wherein the engaging part is a small hole made in the top plate.

16. The concave slot cover according to claim 1, wherein the pair of pressing parts are spaced in such a manner that a distance between them in an area close to the top ends of the extending parts is wider than the distance between the side walls of the concave slot, and
wherein an engaging part which engages with a removal tool for removing the concave slot cover from the concave slot is formed at the top plate.

17. The concave slot cover according to claim 1, wherein the minimum allowable dimension of a distance between an outermost projection of one extending part and an outermost projection of the other extending part is larger than the maximum allowable dimension of the concave slot, and
wherein an engaging part which engages with a removal tool for removing the concave slot cover from the concave slot is formed at the top plate.

18. The concave slot cover according to claim 1, wherein the pair of pressing parts are spaced in such a manner that a distance between them in an area close to the top ends of the extending parts is wider than the distance between the side walls of the concave slot
wherein the minimum allowable dimension of a distance between an outermost projection of one extending part and an outermost projection of the other extending part is larger than the maximum allowable dimension of the concave slot, and
wherein an engaging part which engages with a removal tool for removing the concave slot cover from the concave slot is formed at the top plate.

19. The concave slot cover according to claim 1, wherein the concave slot is a T-slot formed in a table for holding a workpiece.

20. A concave part cover for covering a concave part formed in a machine tool, the concave part cover comprising:
a top plate for covering the concave part; and
a pair of pressing parts extending from the top plate and pressing side walls of the concave part when they are inserted into the concave part;
wherein base ends of the pressing parts are positioned at the top plate in such a manner that the distance between the base ends is shorter than the distance between the side walls pressed by the pressing parts, and portions of extending parts of the pressing parts, which extend from the base ends, are formed to project outwards until they are spaced at a wider distance therebetween than the distance between the side walls of the concave part, and
wherein a relationship between distance W (between the side walls of the concave part), distance L (between an outermost projection of one extending part and an outermost projection of the other extending part), and angle θ (formed by a first line linking the base end of one pressing part and the outermost projection of one extending part and a second line linking the base end of the other pressing part and the outermost projection of the other extending part) is represented by the following mathematical expression 1:

$$W \geq L \cdot \cos(\theta/2)$$ [Mathematical Expression 1]

where W is less than L (W<L)
wherein a small hole made in the top plate engages with a removal tool for removing the concave part cover from the concave part.

21. The concave part cover according to claim 20, wherein a first line linking the base end of one pressing part and an outermost projection of one extending part and a second line linking the base end of the other pressing part and an outermost projection of the other extending part cross each other at an angle of 20 degrees to 30 degrees inclusive.

22. A concave part cover for covering a concave part formed in a machine tool, the concave part cover comprising:
a top plate for covering the concave part, the top plate having lateral surfaces that contact side walls of the concave part when the concave part cover is installed in the concave part;
a pair of pressing parts extending from the top plate and pressing side walls of the concave part when they are inserted into the concave part;
wherein base ends of the pressing parts are positioned at the top plate in such a manner that the distance between the base ends is shorter than the distance between the side walls pressed by the pressing parts, and portions of extending parts of the pressing parts, which extend from the base ends, are formed to project outwards until they are spaced at a wider distance therebetween than the distance between the side walls of the concave part;
wherein the top plate lies below an upper surface of the concave part after the concave part cover is installed in the concave part; and
wherein a relationship between distance W (between the side walls of the concave part), distance L (between an outermost projection of one extending part and an outermost projection of the other extending part), and angle θ (formed by a first line linking the base end of one pressing part and the outermost projection of one extending part and a second line linking the base end of the other pressing part and the outermost projection of the other extending part) is represented by the following mathematical expression 1:

$$W \geq L \cdot \cos(\theta/2)$$ [Mathematical Expression 1]

where W is less than L (W<L).

23. The concave part cover according to claim 22, wherein the lateral surfaces of the top plate are inclined and contact complementary inclined surfaces of the side walls of the concave part after the concave part cover is installed in the concave part.

* * * * *